US012330914B2

(12) United States Patent
Romo et al.

(10) Patent No.: US 12,330,914 B2
(45) Date of Patent: Jun. 17, 2025

(54) ELEVATOR INSTALLATION METHOD AND APPARATUS

(71) Applicant: SafeWorks, LLC, Tukwila, WA (US)

(72) Inventors: David Arevalo Romo, Bonney Lake, WA (US); Christopher Patrick Bates, Spring, TX (US)

(73) Assignee: SafeWorks, LLC, Tukwila, WA (US)

( * ) Notice: Subject to any disclaimer, the term of this patent is extended or adjusted under 35 U.S.C. 154(b) by 727 days.

(21) Appl. No.: 16/277,759

(22) Filed: Feb. 15, 2019

(65) Prior Publication Data

US 2019/0248624 A1 Aug. 15, 2019

Related U.S. Application Data

(60) Provisional application No. 62/631,130, filed on Feb. 15, 2018.

(51) Int. Cl.

| | |
|---|---|
| ***B66B 5/00*** | (2006.01) |
| ***B66B 1/28*** | (2006.01) |
| ***B66B 1/46*** | (2006.01) |
| ***B66B 11/02*** | (2006.01) |
| ***B66B 19/00*** | (2006.01) |

(52) U.S. Cl.

CPC .................. *B66B 5/00* (2013.01); *B66B 1/28* (2013.01); *B66B 1/466* (2013.01); *B66B 19/002* (2013.01); *B66B 11/0206* (2013.01)

(58) Field of Classification Search

CPC . B66B 11/0025; B66B 11/0055; B66B 15/08; B66B 11/005

See application file for complete search history.

(56) References Cited

U.S. PATENT DOCUMENTS

| | | | | |
|---|---|---|---|---|
| 9,617,121 B2 * | 4/2017 | Bolme | .................... | B66B 19/00 |
| 2003/0136611 A1 * | 7/2003 | Erny | ....................... | B66B 19/00 187/401 |
| 2007/0181384 A1 | 8/2007 | Cruz | | |
| 2010/0133048 A1 * | 6/2010 | Barneman | .............. | B66B 19/00 187/414 |

(Continued)

FOREIGN PATENT DOCUMENTS

| | | |
|---|---|---|
| CN | 1217703 A | 5/1999 |
| CN | 1944214 A | 4/2007 |

(Continued)

OTHER PUBLICATIONS

Nakane, Michio, et al. “Installing device of Elevator” Machine translation of the Description of JP 2009196808 A. Sep. 3, 2009 (Year: 2009).*

(Continued)

*Primary Examiner* — Minh Truong
*Assistant Examiner* — Michelle M Mudwilder
(74) *Attorney, Agent, or Firm* — Foley & Lardner LLP

(57) ABSTRACT

An elevator installation system and method is disclosed that includes a support structure having a first surface and a second surface. The support structure is oriented such that the first surface faces in a first direction and the second surface faces in a second direction opposite the first direction. The system further includes a hoist supporting the support structure such that at least a portion of the hoist is positioned facing the second surface.

20 Claims, 6 Drawing Sheets

(56) References Cited

U.S. PATENT DOCUMENTS

| | | | | |
|---|---|---|---|---|
| 2013/0284543 | A1* | 10/2013 | De Jong | B66B 19/002 187/249 |
| 2014/0000987 | A1* | 1/2014 | Peacock | B66B 19/007 187/414 |
| 2015/0314993 | A1 | 11/2015 | Bolme et al. | |

FOREIGN PATENT DOCUMENTS

| | | | | | |
|---|---|---|---|---|---|
| CN | 102341336 | A | | 2/2012 | |
| CN | 103339052 | A | | 10/2013 | |
| EP | 1028082 | A2 | * | 8/2000 | B66B 11/005 |
| EP | 3093262 | A1 | * | 11/2016 | B66B 19/002 |
| JP | 2000-229772 | A | | 8/2000 | |
| JP | 2002-003124 | A | | 1/2002 | |
| JP | 2003-292267 | A | | 10/2003 | |
| JP | 2004331348 | A | * | 11/2004 | |
| JP | 2009-196808 | A | | 9/2009 | |
| JP | 2015-000798 | A | | 1/2015 | |

OTHER PUBLICATIONS

International Patent Application No. PCT/US2019/018305; Int'l Written Opinion and Search Report; dated May 15, 2019; 8 pages.

International Patent Application No. PCT/US2019/018305; Int'l Preliminary Report on Patentability; dated Aug. 27, 2020; 7 pages.

* cited by examiner

ELEVATOR INSTALLATION METHOD AND APPARATUS

CROSS-REFERENCE

This application claims benefit under 35 U.S.C. § 119(e) of Provisional U.S. patent application No. 62/631,130, filed Feb. 15, 2018, the contents of which are incorporated herein by reference in their entirety.

TECHNICAL FIELD

The present disclosure relates generally to systems, devices, and methods related to elevator installation. More specifically, the present disclosure relates to systems, devices, and methods related to elevator installation within an elevator shaft.

BACKGROUND

Structures, such as tall, commercial buildings with multiple floors, typically include an elevator system. Current methods of installation of an elevator system within an elevator shaft includes installation of a temporary work surface within the elevator shaft. The temporary work space can be part of a false car, or part of the elevator car, which will eventually operate to transport passengers within the elevator shaft. The temporary work space provides workers with a platform upon which they can stand to install guide rails and other components of the elevator system within the elevator shaft.

The temporary work space is typically movable, vertically, within the elevator shaft such that components of the elevator system can be installed at different heights within the elevator shaft. As shown in FIG. 1, a false car 2 can be coupled to a hoist 4, and the hoist 4 can be coupled to a suspension element 6, such as a cable, which extends upward and away from a temporary work surface 8 of the false car 2. The hoist 4 includes a control assembly 10 configured to receive an input, for example from a worker 12 standing on the temporary work surface 8. The control assembly 10 is configured to, as a result of the input, activate a lift assembly 14 of the hoist 4. Activation of the lift assembly 10 can result in starting or stopping movement of the false car 2 within the elevator shaft.

Currently hoists 4 are coupled to false cars 2 such that the hoist 4 is positioned above the temporary work surface 8, as shown in FIGS. 1 and 2. Positioning the hoist 4 above the temporary work surface 8 results in the hoist 4 occupying space above the temporary work surface 8 and thereby reducing the amount of space on the temporary work surface 8 available to be used by the worker 12.

In addition, the current method of elevator installation using false cars results in additional steps including construction of the false car, installation of the false car in the elevator shaft, dismantling the false car, and removal of the false car from the elevator shaft. Further, a false car will typically have a lower maximum capacity than the elevator to be installed in the elevator shaft, due to the temporary nature of the false car.

Accordingly, an apparatus and method of installing an elevator in an elevator shaft that includes positioning a hoist at least partially below the temporary work surface may result in increased efficiency (due to additional available working space), reduced costs, and reduced time required to complete the installation.

SUMMARY

According to one aspect of the disclosure, an elevator installation system includes a support structure including a first surface and a second surface, the support structure oriented such that the first surface faces in a first direction and the second surface faces in a second direction opposite the first direction, the support structure configured to support a worker standing on the first surface. The system further includes a hoist and a suspension member. The hoist supports the support structure such that at least a portion of the hoist is positioned facing the second surface, and the suspension member is coupled to the hoist and extends from the hoist in the first direction.

According to another aspect of the disclosure, a method of installing an elevator car in an elevator shaft includes the step of positioning a support structure within the elevator shaft such that a first surface of the support structure faces in a first direction and a second surface of the support structure faces in a second direction opposite the first direction. The method further includes the steps of abutting a hoist with the second surface, standing on the first surface, and moving the support structure in at least one of the first direction and the second direction.

BRIEF DESCRIPTION OF THE DRAWINGS

The foregoing summary, as well as the following detailed description of illustrative embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION OF ILLUSTRATIVE EMBODIMENTS

Figure 1:
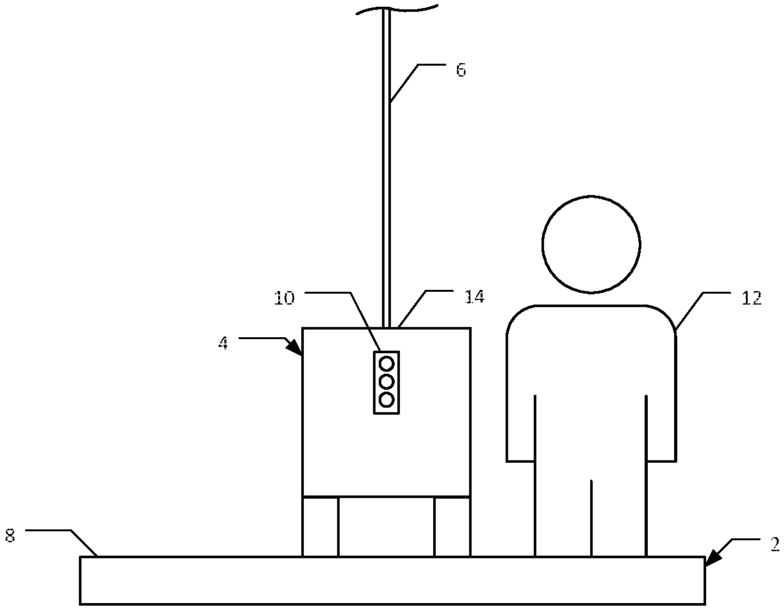
Fig. 1 Prior Art
FIG. 1 is a side elevation view of a known installation system used during installation of an elevator in an elevator shaft, the system including a temporary work surface and a hoist positioned above the temporary work surface.
Figure 2:
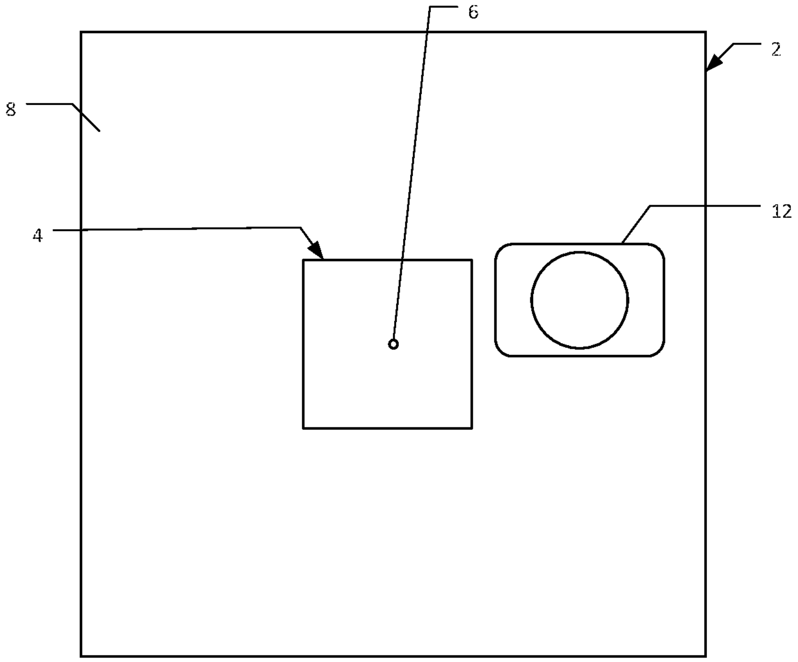
Fig. 2 Prior Art
FIG. 2 is a top plan view of the false car illustrated in FIG. 1.

The embodiments disclosed herein are not limited in application to the details of construction and the arrangement of components set forth in the following description or illustrated in the drawings. The disclosure is capable of other embodiments and of being practiced or being carried out in various ways. Also, the phraseology and terminology used herein is for the purpose of description and should not be regarded as limiting.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure. The terms "up", "upward", and derivatives thereof refer to a direction away from the ground. The terms "down", "downward", and derivatives thereof refer to a direction toward the ground. Certain features of the disclosure, which are described herein in the context of separate embodiments, may also be provided in combination in a single embodiment. Conversely, various features of the disclosure that are described in the context of a single embodiment may also be provided separately or in any subcombination.

Figure 3:
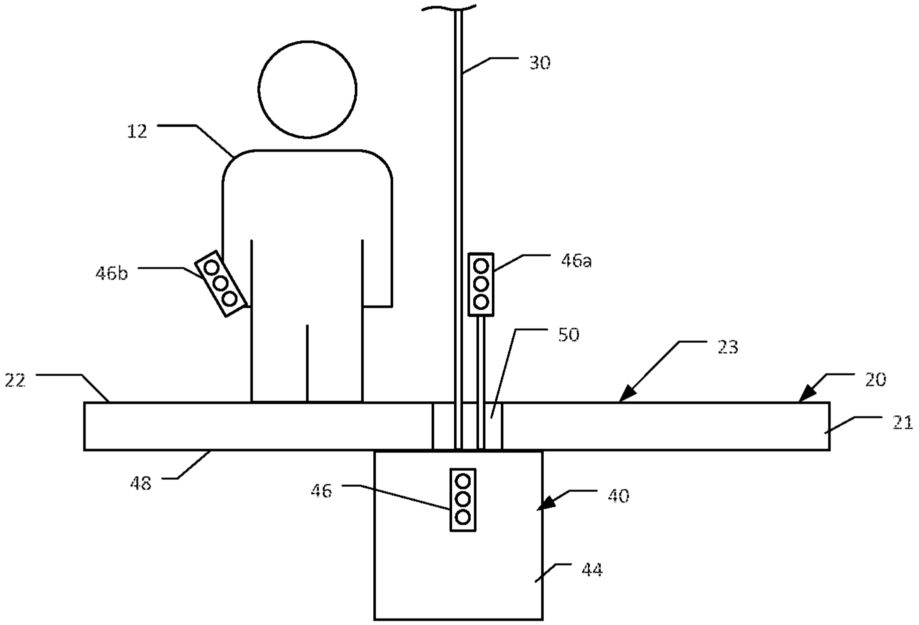
FIG. 3 is a side elevation view of an elevator installation assembly according to one aspect of the disclosure.
Figure 4:
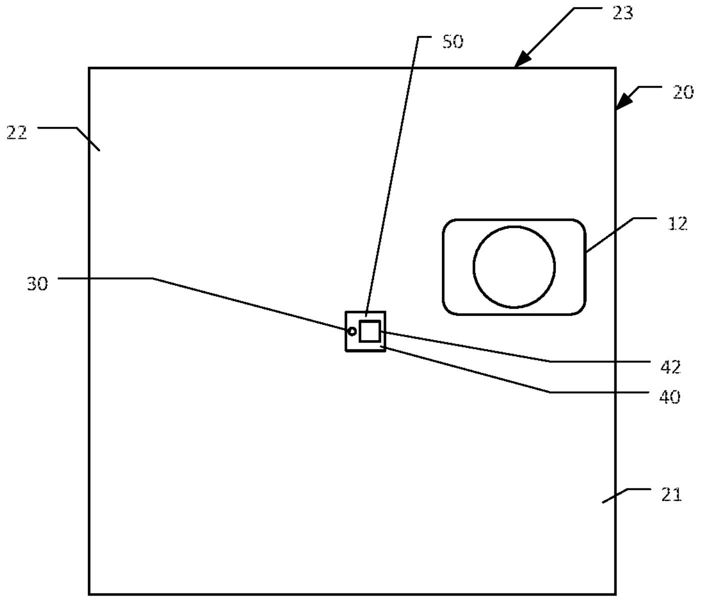
FIG. 4 is a top plan view of the elevator installation assembly illustrated in FIG. 3.
Figure 5:
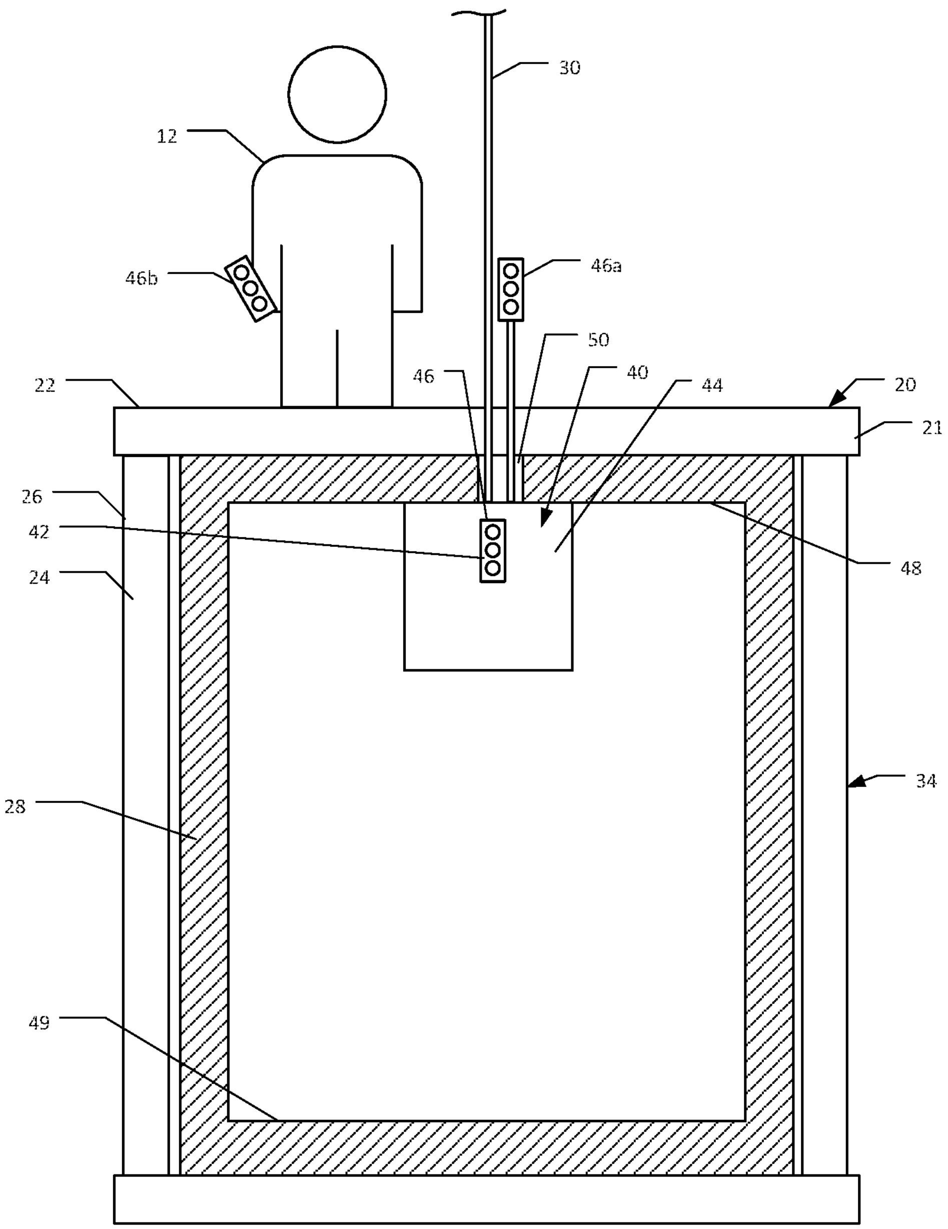
FIG. 5 is a side elevation view of an elevator installation assembly according to one aspect of the disclosure.
Figure 6:
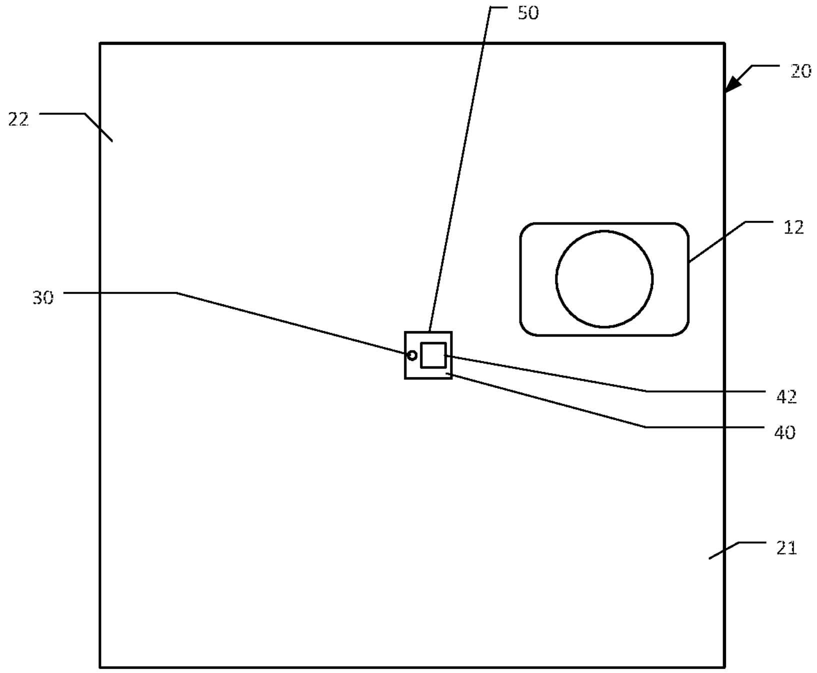
FIG. 6 is a top plan view of the elevator installation assembly illustrated in FIG. 5.

Referring to FIGS. 3 to 6, an elevator installation system 20 can include a support structure 21 configured to support a load. The load can include one or more workers 12, tools, infrastructure, or any combination thereof. The support structure 21 can include a first surface 22. As shown in the illustrated embodiment, the first surface can be oriented such that the first surface 22 faces in a first direction, for example upward. The support structure 21 can include at least a portion of a false car 23 (as shown in FIGS. 3 and 4), or can include at least a portion of an elevator car 24 (as shown in FIGS. 5 and 6), for example one which is being installed and will eventually be used to move passengers vertically within a building in which the elevator car 24 is being installed.

According to one aspect of the disclosure, the at least a portion of the elevator car 24 includes an elevator car sling 26. The elevator car sling 26 can include a frame configured to support an elevator cab 28 in which passengers will be located once installation of the elevator car 24 is complete. According to another aspect of the disclosure, the at least a portion of the elevator car 24 includes the elevator car sling 26 and the elevator cab 28.

According to one aspect of the disclosure, the elevator installation system 20 can include a suspension element 30 and a hoist 40. As shown the suspension element 30 can include, for example a cable, configured to support the hoist 40, and the hoist 40 is configured to support the first surface 22. As shown in the illustrated embodiment, the suspension element 30 can extend upward and away from the first surface 22.

According to one aspect of the disclosure, the hoist 40 is configured to move the first surface 22, for example vertically within an elevator shaft. The hoist 40 can include a control assembly 42 and a lift assembly 44. The control assembly 42 can be configured to receive instructions, for example via input of a worker 12, and relay those instructions to the lift assembly 44, which in turns moves or stops moving the first surface 22.

As shown in the illustrated embodiment, the elevator installation system 20 can include a control panel 46. The control panel 46 can be part of the control assembly 42. According to one embodiment, the control panel 46*a* is directly coupled, for example wired, to the lift assembly 44. According to one embodiment, the control panel 46*b* is indirectly coupled, for example wirelessly, to the lift assembly 44. The worker 12 can input a command into the control panel 46, for example by pushing a button on the control panel 46, and the control panel 46 converts the input into a signal, which the control panel 46 sends to the lift assembly 44.

As shown in the illustrated embodiment, the hoist 40 can be coupled to the first surface 22 such that at least a portion of the hoist 40 is positioned below the first surface 22. According to one embodiment, the hoist 40 can be coupled to the first surface 22 such that an entirety of the hoist 40 except for the control panel 46 is positioned below the first surface 22. Positioning the hoist 40 below the first surface 22 increases the amount of space available for the worker 12 to move around on the first surface 22. According to one aspect of the disclosure, the support structure 21 can include a second surface 48, which faces opposite the first surface 22.

As shown in the illustrated embodiment, the support structure 21 can be oriented such that the second surface 48 faces downward. According to one embodiment, the second surface 48 can include at least a portion of the false car 23 (as shown in FIGS. 3 and 4). According to another embodiment, the second surface 48 can include at least a portion of the elevator car 24 (as shown in FIGS. 5 and 6) The elevator installation system 20 can be configured such that the hoist 40 abuts the second surface 48. As shown in the illustrated embodiment in FIGS. 5 and 6, the second surface 48 can be part of the elevator cab 28. According to another embodiment, the second surface 48 can be part of the elevator car sling 26. The support structure 21 can include a third surface 49 which, as shown in the illustrated embodiment, can both face in the same direction as the first surface 22 (for example up), and be spaced from (for example downward from) the second surface 48.

According to one aspect of the disclosure, the first surface 22 can define an opening 50, which extends to the second surface 48. As shown, the suspension element 30 can extend through first surface 22, via the opening 50, to the second surface 48, whereby the suspension element 30 is coupled to the hoist 40. When the worker 12 applies an input to the control panel 46, the control panel 46 sends a signal to the lift assembly 44, which pushes against the second surface 48 and thereby moves the first surface 22.

Referring to FIGS. 7 to 10, a method of installing the elevator car 24 in an elevator shaft 36 includes one or more of the steps described below. A first section 52*a* of elevator infrastructure 52 is installed in the elevator shaft 36. The elevator infrastructure 52 can include, but is not limited to, guide rails, brake mechanisms, and safety equipment. The first section 52*a* of the elevator infrastructure 52 can include the portion of the elevator infrastructure 52 secured to a lower portion of the elevator shaft 36, for example a portion of the elevator shaft 36 that can be reached by the workers 12 standing on a floor 54 of the elevator shaft 36.

Figure 7:
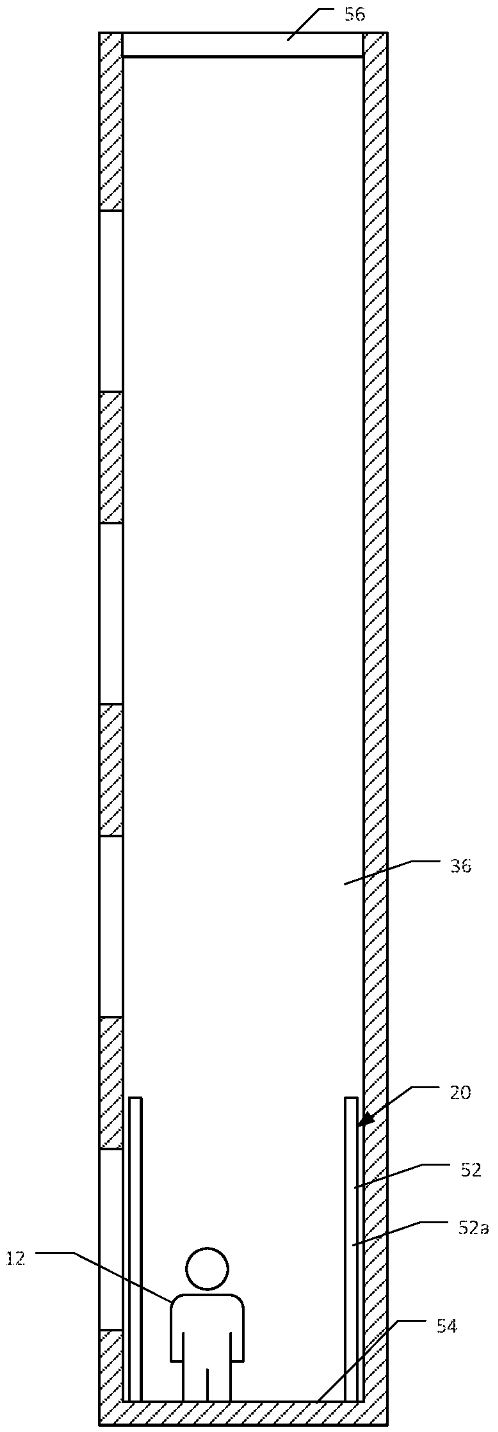
FIG. 7 is a side elevation view of an elevator shaft during a step of a method of installing an elevator in the elevator shaft.
Figure 8:
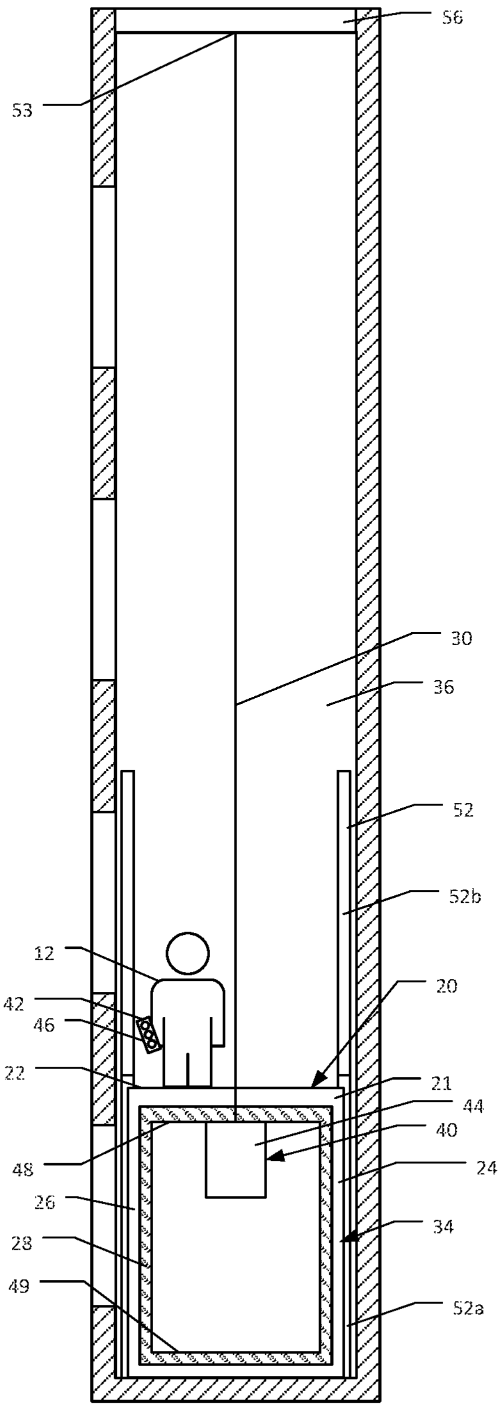
FIG. 8 is a side elevation view of the elevator shaft illustrated in FIG. 7 during another step of the method of installing the elevator in the elevator shaft.
Figure 9:
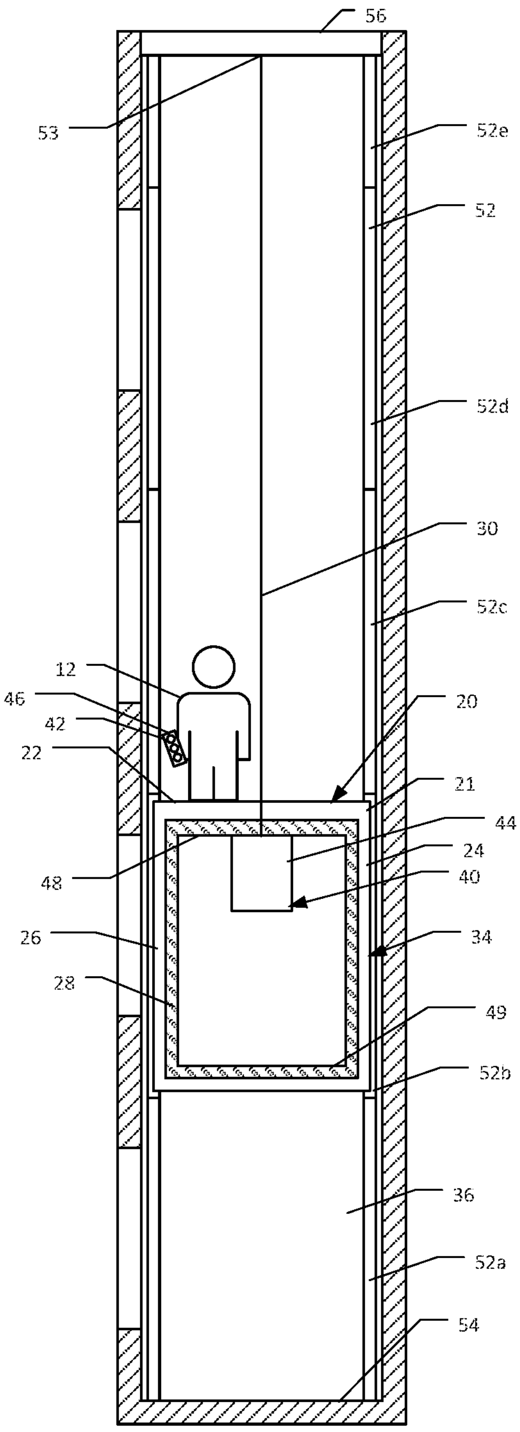
FIG. 9 is a side elevation view of the elevator shaft illustrated in FIG. 7 during another step of the method of installing the elevator in the elevator shaft.
Figure 10:
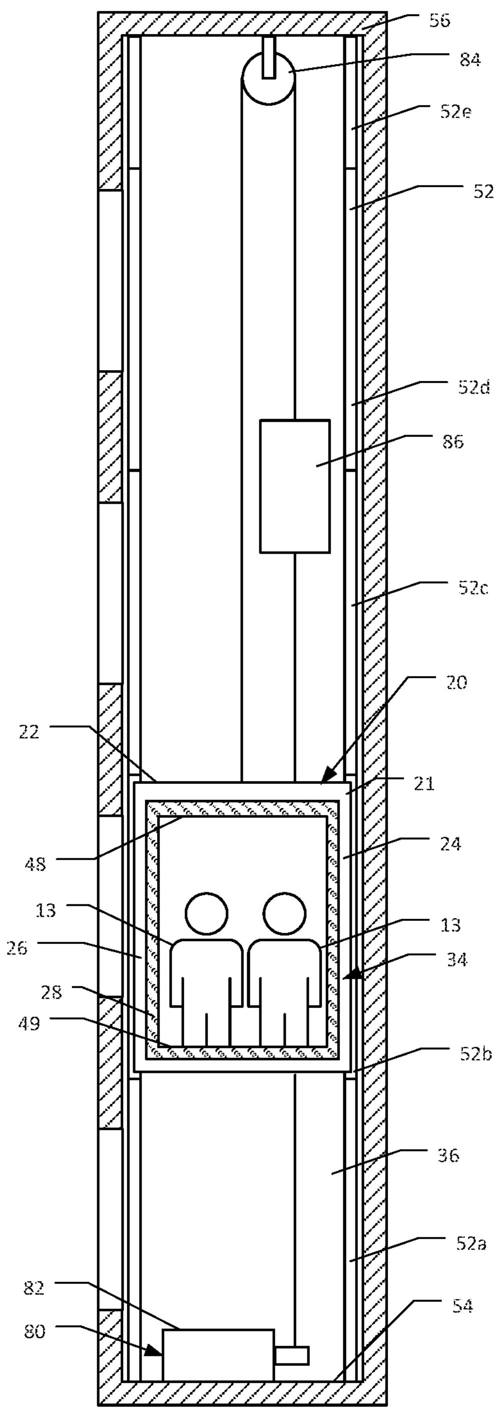
FIG. 10 is a side elevation view of the elevator shaft illustrated in FIG. 7 during another step of the method of installing the elevator in the elevator shaft.

The first surface 22 is positioned within the elevator shaft 36. The first surface 22 can include part of the false car 23, or part of the elevator car 24. According to one aspect of the disclosure, the first surface 22 can be lifted with a crane above the elevator shaft 36, and lowered through a top 56 of the elevator shaft 36 to the floor 54. The top 56 may be open (as shown in FIGS. 7 to 9) during installation of the elevator car 24, and closed (as shown in FIG. 10) after installation is complete. According to another aspect of the disclosure, the first surface 22 can be assembled within the elevator shaft 36. The suspension element 30, for example a first end 31 of the suspension element 30 can be secured to an anchor point 53 in the elevator shaft 34. The anchor point 53 can be near the top 56 of the elevator shaft 36 as shown in the illustrated embodiment. Alternatively, the anchor point 53 can be near the floor 54, or at a point between the top 56 and the floor 54.

The hoist 40 can be positioned below the first surface 22, for example below the false car 23, or in the elevator cab 28 between the second surface 48 and the third surface 49. The hoist 40 can be secured to the second surface 48, for example by fasteners. The suspension element 30, for example a second end 32 of the suspension element 30, can be secured to the hoist 40. If the hoist 40 is not fastened to the second surface 48, the hoist 40 can be activated, thereby moving the hoist 40 up the suspension member 30 until the hoist 40 contacts the second surface 48. The worker 12 can stand on the first surface 22 to install a second section 52*b* of the elevator infrastructure 52. The second section 52*b* of the elevator infrastructure 52 can include the portion of the elevator infrastructure 52 secured to a portion of the elevator shaft 36 adjacent to and above the lower portion, for example a portion of the elevator shaft 36 that can be reached by the workers 12 standing on the first surface 22.

As the worker 12 needs more height to reach the portion of the elevator shaft 36 in which the section of the elevator infrastructure 52 being installed, the worker 12 can apply an input to the control panel 46 of the hoist 40, thereby causing the lift assembly 44 to push on the second surface 48 and change elevation of the first surface 22 within the elevator shaft 36.

Additional sections 52*c*, 52*d*, 52*e*, etc. of the elevator infrastructure 52 can be installed by repeating the steps of raising the first surface 22 to a desired height and then installing a section of the elevator infrastructure 52 that can be reached by standing on the first surface 22 at the desired height.

After installation of all of the elevator infrastructure 52 is complete throughout the elevator shaft 36, the hoist 40 can be disconnected from the suspension element 30 and removed from the elevator shaft 36. The false car 23, if used, can be disassembled and removed from the elevator shaft 36. The elevator car 24 can be inserted into the elevator shaft 36, if a false car 23 was used to install the elevator infrastructure 52, and the elevator car 24 can be connected to a permanent system 80 configured to lift the elevator car 24 during normal use by passengers 13 travelling to different floors of the building in which the elevator shaft 36 is located. One difference between the hoist 40 and the permanent system 80 can include that the hoist 40 changes elevation with the elevator car 24, such that there is no change in relative heights between the hoist 40 and the elevator car 24. The permanent system 80 can include a stationary motor 82 that remains at a fixed height, and the elevator car 24 changes height relative to the stationary motor 82. The permanent system 80 can include one or more traction sheaves 84 and a counterweight 86.

Referring to FIGS. 1 to 10, the false car 2 may have a relatively low maximum capacity due to its temporary nature, and construction often being completed within the elevator shaft 36. Using the elevator car 24 provides a higher maximum capacity, which can lead to more efficient construction time. For example, while a typical false car 2 may have a maximum capacity of about 2,500 pounds, the elevator car 24 may have a maximum capacity of about 5,500 pounds. Installing the first section 52*a* of the elevator infrastructure 52, positioning the first surface 22 within the elevator shaft 36, and coupling the false car 23 or the elevator car 34 to the first section 52*a*, allows the first surface 22 to remain stable during installation of the remaining elevator infrastructure 52.

It will be appreciated that the foregoing description provides examples of the disclosed system. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein. All methods described herein can be performed in any suitable order unless otherwise indicated herein or otherwise clearly contradicted by context.

Although the disclosure has been described in detail, it should be understood that various changes, substitutions, and alterations can be made herein without departing from the spirit and scope of the invention as defined by the appended claims. Moreover, the scope of the present disclosure is not intended to be limited to the particular embodiments described in the specification. As one of ordinary skill in the art will readily appreciate from the disclosure of the present invention, processes, machines, manufacture, composition of matter, means, methods, or steps, presently existing or later to be developed that perform substantially the same function or achieve substantially the same result as the corresponding embodiments described herein may be utilized according to the present disclosure.

What is claimed:

1. An elevator installation system comprising:

a support structure including a first surface and a second surface, the support structure oriented such that the first surface faces in a first direction and the second surface faces in a second direction opposite the first direction, the support structure configured to support a worker standing on the first surface, wherein the support structure includes at least a portion of an elevator car and wherein the elevator car includes an elevator cab and the elevator cab defines the second surface, wherein the elevator cab comprises an interior space for use by passengers when the first surface is not in use by the worker;

a hoist supporting the support structure such that at least a portion of the hoist is positioned facing the second surface; and a suspension member coupled to the hoist and extending from the hoist in the first direction.

2. The elevator installation system of claim 1, wherein the suspension member is connected to the hoist at a location spaced from the first surface in the second direction.

3. The elevator installation system of claim 2, wherein the suspension member is connected to the hoist at a location spaced from the second surface in the second direction.

4. The elevator installation system of claim 1, wherein the hoist includes a lift assembly and a control panel, the lift assembly configured to move the support structure, the control panel configured to receive an input, and the control panel connected to the lift assembly such that upon receiving the input the control panel sends a signal to the lift assembly activating the lift assembly and moving the support structure.

5. The elevator installation system of claim 4, wherein the control panel is wirelessly connected to the lift assembly.

6. The elevator installation system of claim 4, wherein the control panel is wired to the lift assembly.

7. The elevator installation system of claim 1, wherein a control panel is positioned at a location spaced from the first surface in the first direction.

8. The elevator installation assembly of claim 7, wherein the control panel is secured to a lift assembly such that relative movement between the control panel and the lift assembly is prevented.

9. The elevator installation assembly of claim 7, wherein the control panel is unsecured to a lift assembly such that the control panel is movable relative to the lift assembly.

10. The elevator installation system of claim 1, wherein the elevator car includes an elevator car sling and the elevator car sling defines the first surface.

11. The elevator installation system of claim 1, wherein the support structure includes a third surface that both faces in the first direction and is spaced from the second surface in the second direction, and the at least a portion of the hoist is positioned between the second surface and the third surface.

12. A method of installing an elevator car in an elevator shaft, the method comprising the steps of:

positioning a support structure within the elevator shaft such that a first surface of the support structure faces in a first direction and a second surface of the support structure faces in a second direction opposite the first direction, wherein the support structure includes at least a portion of an elevator car and wherein the at least a portion of the elevator car includes an elevator cab and the elevator cab defines the second surface, wherein the elevator cab comprises an interior space for use by passengers when the first surface is not in use by a worker;

abutting a hoist with the second surface; and moving the support structure in at least one of the first direction and the second direction with the worker standing on the first surface.

13. The method of claim 12, further comprising a step of installing a first section of elevator infrastructure.

14. The method of claim 13, wherein the installing step is performed before the positioning step, and the first section of elevator infrastructure is installed in a lower portion of the elevator shaft.

15. The method of claim 13, further comprising a step of coupling the support structure to the first section of elevator infrastructure, thereby restricting movement of the support structure in a third direction perpendicular to both the first direction and the second direction.

16. The method of claim 15, further comprising a step of installing a second section of elevator infrastructure in a portion of the elevator shaft adjacent to and above a lower portion of the elevator shaft.

17. The method of claim 15, wherein the coupling step is performed before the moving step.

18. The method of claim 12, wherein the moving step includes a step of activating the hoist, thereby applying a force on the second surface in the first direction.

19. The method of claim 12, further comprising a step of removing the hoist from abutment with the second surface.

20. The method of claim 12, wherein the hoist is coupled to the support structure such that the moving step includes a step of moving the hoist with the support structure.

* * * * *